US012199365B2

(12) United States Patent
Lee et al.

(10) Patent No.: US 12,199,365 B2
(45) **Date of Patent: *Jan. 14, 2025**

(54) WIDEBAND ANTENNA AND ANTENNA MODULE INCLUDING THE SAME

(71) Applicant: SAMSUNG ELECTRONICS CO., LTD., Suwon-si (KR)

(72) Inventors: Youngki Lee, Suwon-si (KR); Sunwoo Lee, Suncheon-si (KR); Dooseok Choi, Hwaseong-si (KR); Seungchan Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,276

(22) Filed: Nov. 6, 2023

(65) Prior Publication Data

US 2024/0072446 A1 Feb. 29, 2024

Related U.S. Application Data

(63) Continuation of application No. 17/833,378, filed on Jun. 6, 2022, now Pat. No. 11,843,190, which is a (Continued)

(30) Foreign Application Priority Data

Jun. 10, 2019 (KR) ........................ 10-2019-0068268

(51) Int. Cl.
*H01Q 9/04* (2006.01)
*H01Q 1/38* (2006.01)

(52) U.S. Cl.
CPC ............... *H01Q 9/045* (2013.01); *H01Q 1/38* (2013.01); *H01Q 9/0414* (2013.01)

(58) Field of Classification Search
CPC ........ H01Q 9/045; H01Q 1/38; H01Q 9/0414; H01Q 1/243; H01Q 9/285; H01Q 21/08;
(Continued)

(56) References Cited

U.S. PATENT DOCUMENTS

| | | | |
|---|---|---|---|
| 7,012,573 | B2 | 3/2006 | Tchistiakov et al. |
| 9,357,633 | B2 | 5/2016 | Kobayashi et al. |
| 9,941,595 | B2 | 4/2018 | Yang et al. |

(Continued)

FOREIGN PATENT DOCUMENTS

| | | | |
|---|---|---|---|
| CN | 101075702 | A | 11/2007 |
| CN | 102792519 | A | 11/2012 |

(Continued)

OTHER PUBLICATIONS

Communication dated Apr. 26, 2024, issued by the China National Intellectual Property Administration in Chinese Application No. 202010348499.0.

*Primary Examiner* — David E Lotter
(74) *Attorney, Agent, or Firm* — Sughrue Mion, PLLC

(57) ABSTRACT

Provided is an antenna module including a plurality of conductive layers stacked in a first direction, the antenna module including a first patch antenna including at least one radiator provided in at least one conductive layer, and an electromagnetic band gap (EBG) structure including a plurality of pillars spaced apart from the at least one radiator in a direction perpendicular to the first direction, the plurality of pillars surrounding the at least one radiator, wherein each of the plurality of pillars includes two or more plates provided parallel with each other in two or more conductive layers, respectively, and at least one via connecting the two or more plates.

15 Claims, 25 Drawing Sheets

Related U.S. Application Data continuation of application No. 16/731,546, filed on Dec. 31, 2019, now Pat. No. 11,355,850.

(58) Field of Classification Search
CPC ............ H01Q 25/02; H01Q 5/50; H01Q 1/46; H01Q 9/0407; H01Q 21/067
See application file for complete search history.

(56) References Cited

U.S. PATENT DOCUMENTS

| | | | |
|---|---|---|---|
| 10,135,155 | B2 | 11/2018 | Sudo et al. |
| 10,170,838 | B2 | 1/2019 | Garcia et al. |
| 11,355,850 | B2 * | 6/2022 | Lee .......................... H01Q 1/38 |
| 11,843,190 | B2 * | 12/2023 | Lee ........................ H01Q 9/285 |
| 2016/0028161 | A1 | 1/2016 | Kawaguchi |
| 2016/0056544 | A1 * | 2/2016 | Garcia ................. H01Q 9/0407 343/725 |
| 2017/0317418 | A1 | 11/2017 | Garcia et al. |
| 2017/0317421 | A1 | 11/2017 | Grando et al. |
| 2017/0353338 | A1 | 12/2017 | Amadjikpe et al. |
| 2018/0316098 | A1 | 11/2018 | Amadjikpe |
| 2019/0020100 | A1 | 1/2019 | Jong |
| 2019/0098750 | A1 | 3/2019 | Woo |
| 2019/0319369 | A1 | 10/2019 | Chiang |
| 2020/0076072 | A1 | 3/2020 | Keyrouz |
| 2020/0235470 | A1 * | 7/2020 | Uchimura ............ H01Q 9/0457 |
| 2020/0315001 | A1 * | 10/2020 | Khan ....................... H01Q 1/38 |
| 2021/0168932 | A1 | 6/2021 | Woo |

FOREIGN PATENT DOCUMENTS

| | | | |
|---|---|---|---|
| CN | 107615588 | A | 1/2018 |
| JP | 2008-283381 | A | 11/2008 |
| JP | 2011-091557 | A | 5/2011 |
| JP | 2012-049767 | A | 3/2012 |

* cited by examiner

WIDEBAND ANTENNA AND ANTENNA MODULE INCLUDING THE SAME

CROSS-REFERENCE TO THE RELATED APPLICATION

This application is a continuation of Ser. No. 17/833,378, filed Jun. 6, 2022, which is a continuation of U.S. application Ser. No. 16/731,546, filed Dec. 31, 2019, which claims priority to Korean Patent Application No. 10-2019-0068268, filed on Jun. 10, 2019 in the Korean Intellectual Property Office, the disclosure of which is incorporated herein in its entirety by reference.

BACKGROUND

Field

Example embodiments of the present disclosure relate to wireless communication, and more particularly, to a wideband antenna and an antenna module including the same.

2. Description of the Related Art

To increase throughput of wireless communication, a high frequency band may be used. For example, wireless communication systems such as $5^{th}$ generation (5G) specify a use of millimeter wave (mmWave) frequency bands. Accordingly, an antenna for the wireless communication may be required to provide a wide frequency bandwidth. In addition, an antenna array including a plurality of antennas may be used for beamforming, and the antenna array may be required to provide a good beam coverage. However, in the case of portable wireless communication devices such as mobile phones, a space for the antenna may be limited, and accordingly, an antenna which provides good performance despite the limited space and other components adjacent to the antenna may be required.

SUMMARY

One or more example embodiments provide a wideband antenna providing improved performance and high utilization even in a limited space, and an antenna module including the wideband antenna.

According to an aspect of an example embodiment, there is provided an antenna module including a plurality of conductive layers stacked in a first direction, the antenna module including a first patch antenna including at least one radiator provided in at least one conductive layer, and an electromagnetic band gap (EBG) structure including a plurality of pillars spaced apart from the at least one radiator in a direction perpendicular to the first direction, the plurality of pillars surrounding the at least one radiator, wherein each of the plurality of pillars includes two or more plates provided parallel with each other in two or more conductive layers, respectively, and at least one via connecting the two or more plates.

According to another aspect of an example embodiment, there is provided an antenna module including a plurality of conductive layers stacked in a first direction, the antenna module including an endfire antenna including a first pattern and a second pattern having symmetrical shapes to each other, the first pattern and the second pattern being configured to receive differential signals from feed lines adjacent to each other in a second direction, wherein the first pattern and the second pattern are respectively provided in different conductive layers, and respectively include overlapping portions in the first direction.

According to another aspect of an example embodiment, there is provided an antenna module including a plurality of conductive layers stacked in a first direction, the antenna module including a molding portion including a first region and a second region that are adjacent to each other in a second direction perpendicular to the first direction, the molding portion including an epoxy molding compound (EMC), a first patch antenna including at least one radiator provided in at least one conductive layer over the first region, and an endfire antenna including a first pattern and a second pattern having shapes symmetrical to each other, the endfire antenna being provided over the second region, and the first pattern and the second pattern being configured to receive differential signals.

According to another aspect of an example embodiment, there is provided a design method of an antenna module including a patch antenna, the design method including determining, based on impedance of the patch antenna, a pitch of a plurality of pillars included in an electromagnetic band gap (EBG) structure surrounding a radiator of the patch antenna, and determining, based on the impedance of the patch antenna, the number and dimensions of plates included in each of the plurality of pillars that are parallel with each other.

BRIEF DESCRIPTION OF THE DRAWINGS

The above and other aspects and features will be more clearly understood from the following detailed description taken in conjunction with the accompanying drawings in which.

DETAILED DESCRIPTION OF THE EMBODIMENTS

Figure 1:
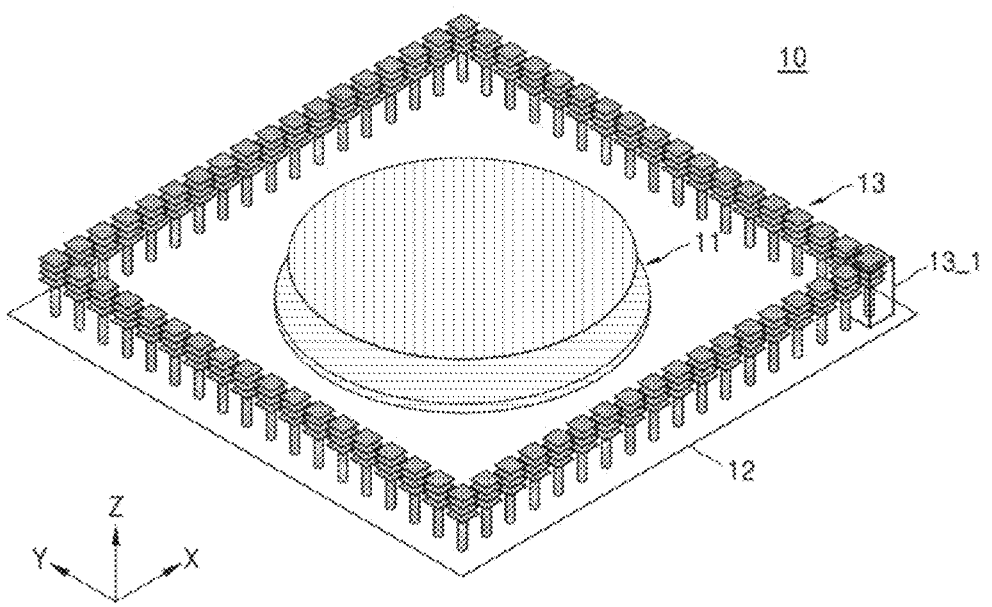
FIG. 1 is a perspective view of an antenna module according to an example embodiment.

In the present specification, a Z-axis direction may be referred to as a first direction which is a direction in which a plurality of conductive layers are stacked, a component arranged in a +Z direction relative to other components may be referred to as being on or over other components, and a component arranged in a −Z direction relative to other components may be referred to as being under or beneath other components. A Y-axis direction and an X-axis direction may be referred to as a second direction and a third direction, respectively, and a plane formed by the X-axis and the Y-axis may be referred to as a horizontal plane, and a plane perpendicular to the X-axis or Y-axis may be referred to as a side surface of a component. Unless otherwise stated in the present specification, an area of a component may be referred to as a size occupied by the component in a plane parallel to the horizontal plane, and for convenience of illustration, only some layers may be illustrated in the drawings in the present specification.

FIG. 1 is a perspective view of an antenna module 10 according to an example embodiment. As illustrated in FIG. 1, the antenna module 10 may include a patch antenna 11, a ground plane 12, and an electromagnetic band-gap (EBG) structure 13, and may include a plurality of conductive layers. The antenna module 10 may be an antenna or a patch antenna, and may also be a single element of an antenna array.

The antenna module 10 may output and receive signals for wireless communication. For example, the antenna module 10 may be included in a wireless communication device included in a wireless communication system. The wireless communication system may include, for example, a wireless communication system using a cellular network such as a 5th generation (5G) wireless system, a long term evolution (LTE) system, an LTE-Advanced system, a code division multiple access (CDMA) system, and a global system for mobile communications (GSM) system, a wireless local area network (WLAN) system, or any other wireless communication system. Below, a wireless communication system is described mainly with reference to a wireless communication system using a cellular network, but example embodiments are not limited thereto.

In example embodiments, the antenna module 10 may be included in user equipment (UE) as a wireless communication device included in a wireless communication system. The UE may be stationary or mobile and may be any device capable of communicating with a base station to transceive data and/or control information. For example, the UE may include a terminal, terminal equipment, a mobile station (MS), a mobile terminal (MT), a user terminal (UT), a subscriber station (SS), a wireless device, a handheld device, etc.

To increase throughput, the wireless communication may use a high frequency band. For example, the 3rd generation partnership project (3GPP) may propose millimeter wave (mmWave) frequency bands above 24 GHz in new radio (NR). For such a high frequency band, the antenna module 10 may be required to provide a wide bandwidth, but the space for the antenna module 10 in the UE such as a mobile phone may be limited, and the space for the antenna module 10 may be further reduced due to miniaturization of the UE. In addition, influence from peripheral components on the antenna module 10 may be increased. As described below with reference to the drawings, antenna modules according to example embodiments may have reduced sizes while providing wide bandwidths, and thus, may be included in the UE such as a mobile phone. In addition, the required performance of an antenna may be more easily achieved due to adjustable dimensions, and the performance of a wireless communication device including the antenna may be improved by using materials that provide relatively good characteristics.

Referring to FIG. 1, the patch antenna 11 may include at least one radiator over the ground plane 12. The radiator may be formed in a conductive layer and may include, for example, a metal. When the patch antenna 11 includes two or more radiators parallel to each other, a feed line may be connected to a lowermost radiator (for example, 11_3 in FIG. 3) and a coupling between the radiators may occur. The radiator may have a circular shape, as illustrated in FIG. 1, or may have any shape such as a rectangular shape. The example embodiments are described mainly with reference to the patch antenna 11 including three circular radiators parallel to each other, but embodiments are not limited thereto.

The EBG structure may be a structure which generates a stop band blocking electromagnetic waves in a particular frequency band, by forming small metal patterns periodically arranged on a dielectric substrate. The EBG structure 13 in FIG. 1 may include a plurality of pillars surrounding the patch antenna 11 in a direction perpendicular to the Z-axis direction, and the plurality of pillars may be configured to receive a ground potential. For example, as illustrated in FIG. 1, the EBG structure 13 may include a pillar 13_1 connected to the ground plane 12, and a plurality of pillars, each having the same structure as the pillar 13_1, may be arranged in the X-axis and Y-axis directions on the ground plane 12 surrounding the patch antenna 11. However, embodiments are not limited thereto, and a different number of pillars from the number of the pillars as illustrated in FIG. 1 may surround the patch antenna 11.

Referring to FIG. 1, two or more plates parallel to each other may be periodically arranged in the EBG structure 13. For example, the pillar 13_1 may include four plates parallel to each other respectively formed in four conductive layers, and the four plates parallel to each other may be periodically arranged by the plurality of pillars in the X-axis direction and Y-axis direction. In example embodiments, each of the plates included in the pillar 13_1 may be formed in conductive layers different from the conductive layers in which the radiators of the patch antenna 11 are formed. The EBG structure 13 may improve impedance matching in a target frequency band by increasing the ground potential and may improve the impedance in a multi-band by adjusting a pitch between the plurality of pillars and the size of the plates. In addition, if the EBG structure 13 is included in an antenna array in which a plurality of patch antennas are arranged, characteristics of the antenna array may be improved by removing surface waves that may occur in a microstrip antenna. An example of a pillar included in the EBG structure 13 is described below with reference to FIGS. 4A and 4B.

Figure 2A:
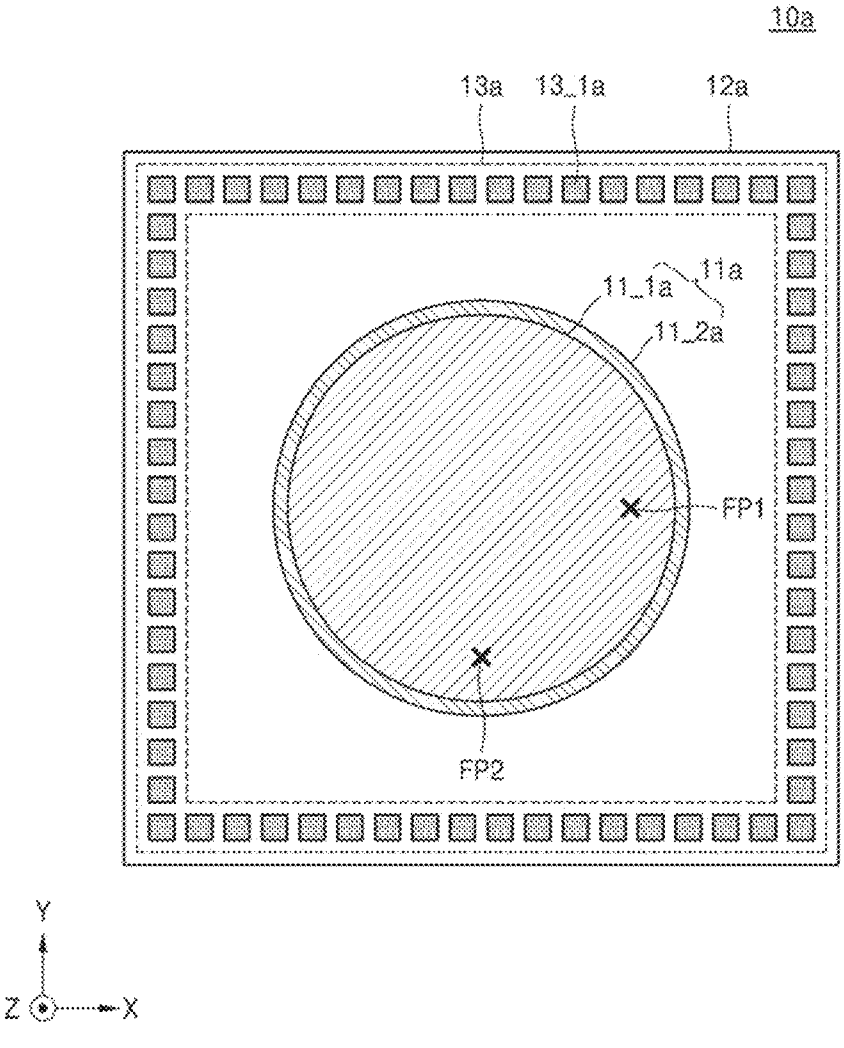
FIGS. 2A and 2B are plan views of examples of antenna modules according to example embodiments.
Figure 2B:
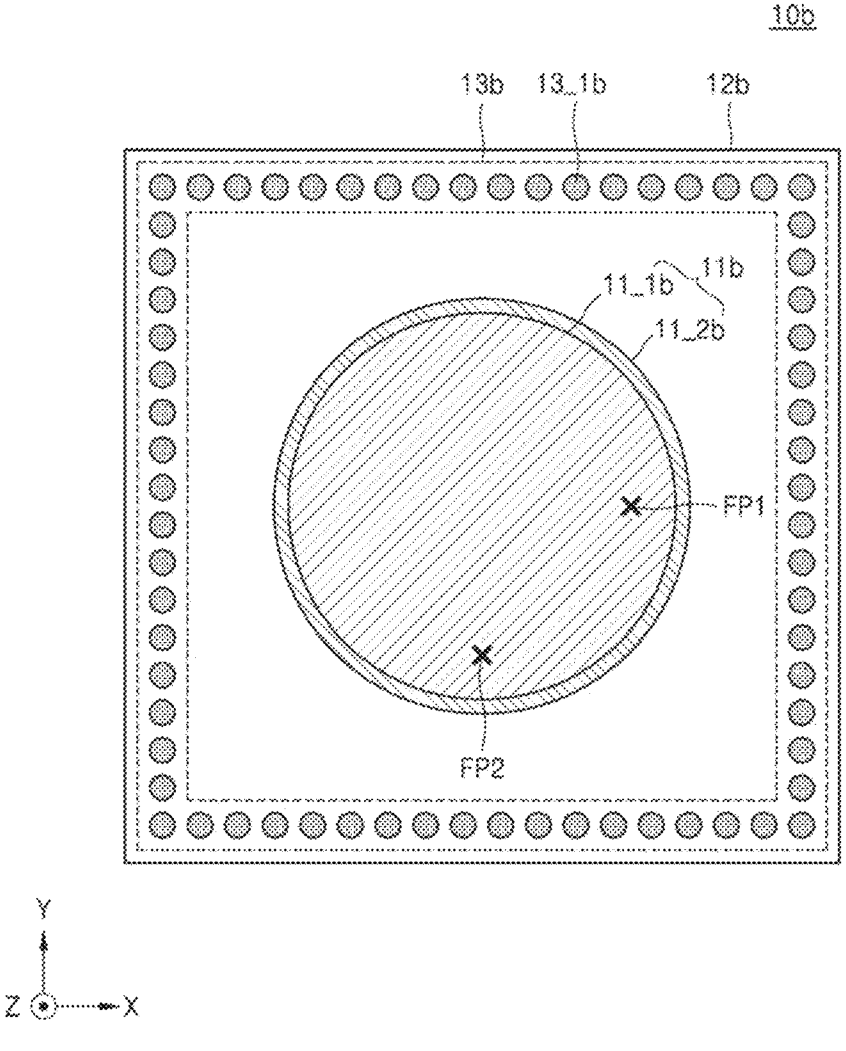

FIGS. 2A and 2B are plan views of examples of antenna modules 10*a* and 10*b* according to example embodiments. The plan views of FIGS. 2A and 2B illustrate EBG structures 13*a* and 13*b*, each including plates of different shapes, respectively. As described above with reference to FIG. 1, the EBG structures 13*a* and 13*b* in FIGS. 2A and 2B may surround patch antennas 11*a* and 11*b* in a direction perpendicular to the Z-axis direction, respectively, and may respectively include a plurality of pillars.

Referring to FIG. 2A, the antenna module 10*a* may include the patch antenna 11*a*, a ground plane 12*a*, and the EBG structure 13*a*. The patch antenna 11*a* may include a first radiator 11_1*a* and a second radiator 11_2*a* over the ground plane 12*a*, and may further include a third radiator (for example, 11_3 in FIG. 3) between the second radiator 11_2*a* and the ground plane 12*a*. In example embodiments, the first radiator 11_1*a* at the uppermost position, the second radiator 11_2*a* at an intermediate position, and the third radiator at the lowermost position may have decreasing areas in the order of the second radiator 11_2*a*, the third radiator, and the first radiator 11_1*a*. In example embodiments, the patch antenna 11*a* may be connected to two feed lines for dual-polarization. For example, as illustrated in FIG. 2A, the patch antenna 11*a* may be connected to the feed lines at a first feed point FP1 and a second feed point FP2, respectively. The third radiator at the lowermost position may be connected to vias included in the feed lines at the first feeding point FP1 which is spaced apart from the center of the third radiator in the X-axis direction and at the second feeding point FP2 which is spaced apart from the center of the third radiator in the −Y-axis direction.

The EBG structure 13*a* may include a plurality of pillars including rectangular plates, as indicated by dashed lines in FIG. 2A. For example, as illustrated in FIG. 2A, a pillar 13_1*a* may include a square plate, and as described above with reference to FIG. 1, may further include at least one rectangular plate parallel to the plates illustrated in FIG. 2A. Hereinafter, example embodiments are described with reference to a plurality of pillars including rectangular plates, like the EBG structure 13*a* in FIG. 2A, but embodiments are not limited thereto.

Referring to FIG. 2B, the antenna module 10*b* may include a patch antenna 11*b*, a ground plane 12*b*, and the EBG structure 13*b*. The patch antenna 11*b* may include a first radiator 11_1*b* and a second radiator 11_2*b* over the ground plane 12*b*, and may further include a third radiator (for example, 11_3 in FIG. 3) between the second radiator 11_2*b* and the ground plane 12*b*. The patch antenna 11*b* may be connected to the feed lines at the first feed point FP1 and the second feed point FP2 for dual polarization. The EBG structure 13*b* may include a plurality of pillars including circular plates, as indicated by dashed lines in FIG. 2B. For example, as illustrated in FIG. 2B, a pillar 13_1*b* may include a circular plate, and as described above with reference to FIG. 1, may further include at least one circular plate parallel to the plates illustrated in FIG. 2B.

Figure 3:
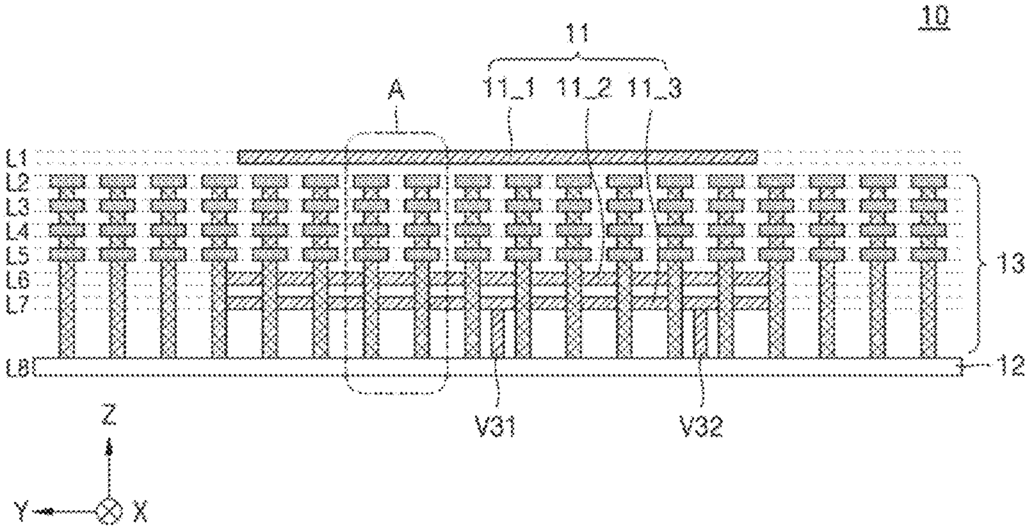
FIG. 3 is a side view of an antenna module according to an example embodiment.

FIG. 3 is a side view of the antenna module 10 according to an example embodiment. The side view of FIG. 3 illustrates the antenna module 10 of FIG. 1 in a direction parallel to the X-axis direction. Hereinafter, descriptions to be given with reference to FIG. 3 overlapping those given with reference to FIG. 1 are omitted.

Referring to FIG. 3, the antenna module 10 may include the patch antenna 11, the ground plane 12, and the EBG structure 13. The patch antenna 11 may include a first radiator 11_1, a second radiator 11_2, and a third radiator 11_3. The third radiator 11_3 may be connected to a first via V31 and a second via V32 each included in the feed lines. The EBG structure 13 may include the plurality of pillars. Each of the plurality of pillars may include four plates parallel to each other and may include vias interconnecting the plates. In example embodiments, the plurality of pillars may be connected to the ground plane 12.

The antenna module 10 may include a plurality of conductive layers. For example, as illustrated in FIG. 3, the antenna module 10 may include first through eighth conductive layers L1 through L8 sequentially arranged. Each of the first through eighth conductive layers L1 through L8 may include a pattern including a conductive material, for example, a metal. For example, as illustrated in FIG. 3, the first radiator 11_1 may be formed in the first conductive layer L1, the second radiator 11_2 may be formed in the sixth conductive layer L6, and the third radiator 11_3 may be formed in the seventh conductive layer L7. In addition, the ground plane 12 may be formed in the eighth conductive layer L8. In example embodiments, a dielectric material may be provided between each of the first through eighth conductive layers L1 through L8.

The pillars included in the EBG structure 13 may include plates formed in conductive layers different from the conductive layers in which the first through third radiators 11_1, 11_2, and 11_3 of the patch antenna 11 are formed. For example, as illustrated in FIG. 3, the pillars of the EBG structure 13 may include plates respectively formed in the second conductive layer L2, the third conductive layer L3, the fourth conductive layer L4, and the fifth conductive layer L5, which are layers different from the first conductive layer L1, the sixth conductive layer L6, and the seventh conductive layer L7, in which the first radiator 11_1, the second radiator 11_2, and the third radiator 11_3 are respectively formed. Examples of pillars are described below with reference to FIGS. 4A and 4B, which illustrate examples of a region A of FIG. 3 including two adjacent pillars.

In example embodiments, the antenna module 10 may be manufactured by a printed circuit board (PCB) process. In the PCB process, when a pattern included in a conductive layer is absent or not sufficient, a formation of the corresponding conductive layer may not be easy, and a final structure different from a designed structure may be formed due to the corresponding conductive layer. Thus, an additional operation may be required to prevent or reduce such undesirable phenomena. According to an example embodiment, as illustrated in FIG. 3, the plates included in the pillars of the EBG structure may be formed in the conductive layers in which the radiators 11_1, 11_2, and 11_3 of the patch antenna 11 are not formed, and accordingly, an antenna module may be more easily manufactured, and as a result, cost and time for manufacturing the antenna module 10 may be reduced.

However, example embodiments are not limited to the structure illustrated in FIG. 3. For example, in example embodiments, the patch antenna 11 may include less than or more than three radiators parallel to each other, and the radiators may be formed in different conductive layers from the conductive layers illustrated in FIG. 3. In addition, in example embodiments, the EBG structure 13 may include a pillar which includes less than or more than four plates, and the plates may be formed in different conductive layers from the conductive layers illustrated in FIG. 3.

Figure 4A:
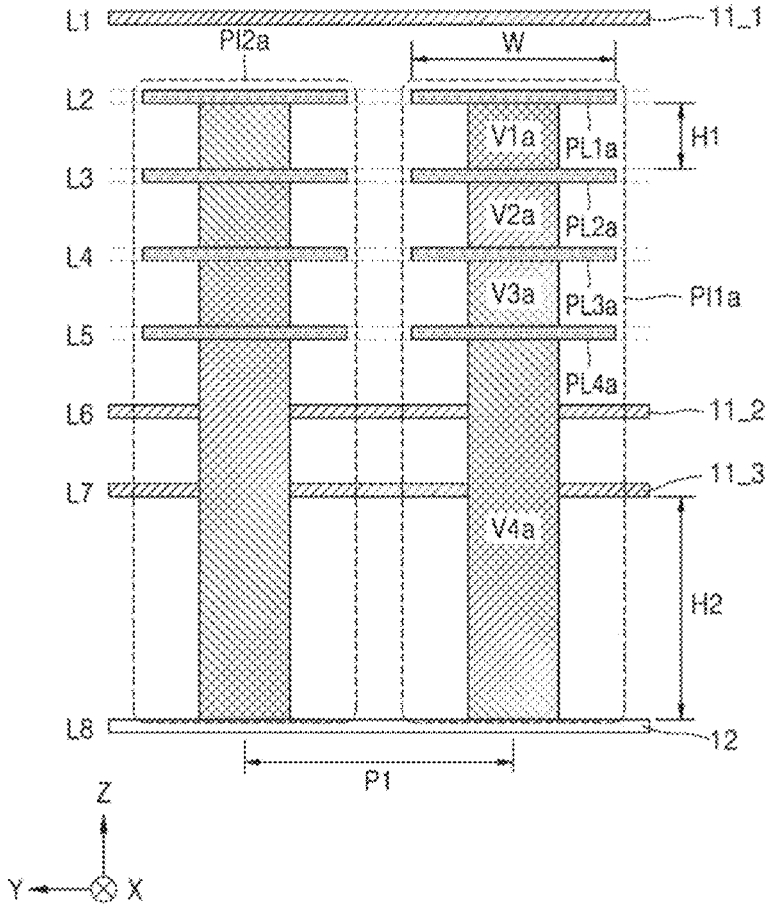
FIGS. 4A and 4B are side views of pillars according to example embodiments.
Figure 4B:
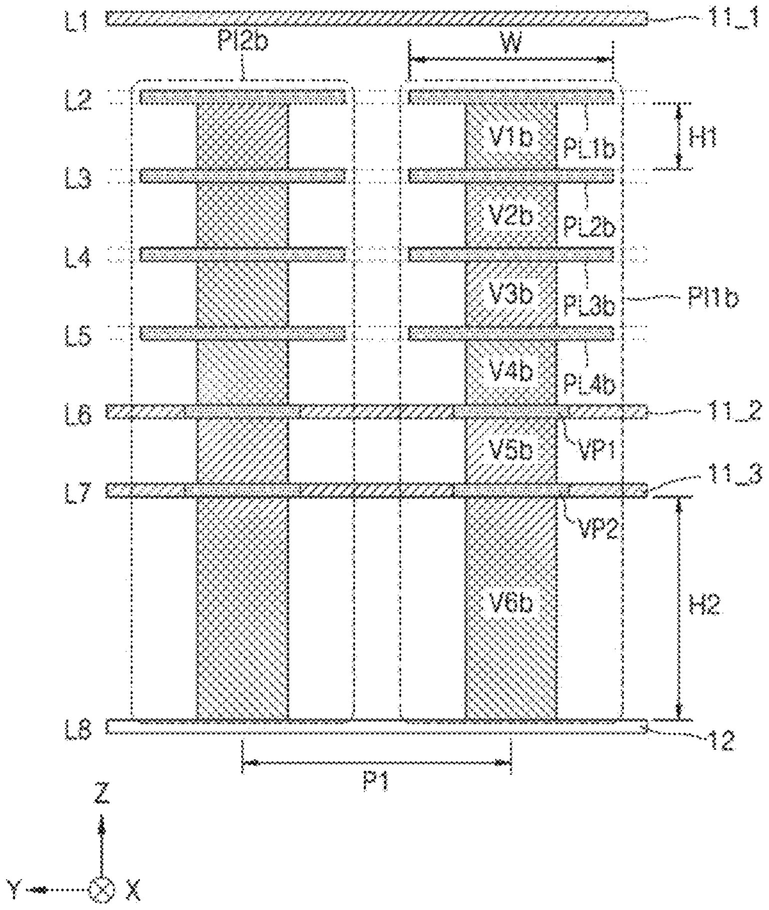

FIGS. 4A and 4B are side views of pillars according to example embodiments. The side views of FIGS. 4A and 4B illustrate examples of the region A of FIG. 3 including two adjacent pillars.

In FIGS. 4A and 4B, the first radiator 11_1, the second radiator 11_2, and the third radiator 11_3 may be formed in the first conductive layer L1, the sixth conductive layer L6, and the seventh conductive layer L7, respectively, and the ground plane 12 may be formed in the eighth conductive layer L8. In example embodiments, a distance between the first through seventh conductive layers L1 through L7 may be constant as a first distance H1, while a second distance H2 between the seventh conductive layer L7 and the eighth conductive layer L8 may be greater than the first distance H1.

Referring to FIG. 4A, a first pillar PI1*a* having the same structure as a second pillar PI2*a* may be adjacent to the second pillar PI2*a* at a first pitch P1. In the present disclosure, a pitch may be referred to as a distance between centers of adjacent components. The first pillar PI1*a* may include a first plate PL1*a*, a second plate PL2*a*, a third plate PL3*a*, and a fourth plate PL4*a*, which are formed in the second conductive layer L2, the third conductive layer L3, the fourth conductive layer L4, and the fifth conductive layer L5, respectively. As described above with reference to FIGS. 2A and 2B, each of the first through fourth plates PLla through PL4*a* may have any shape on an XY plane or the horizontal plane. In addition, the first pillar PI1*a* may include a first via Vla connecting the first plate PLla to the second plate PL2*a*, a second via V2*a* connecting the second plate PL2*a* to the third plate PL3*a*, and a third via V3*a* connecting the third plate PL3*a* to the fourth plate PL4*a*, and may include a fourth via V4*a* connecting the fourth plate PL4*a* to the ground plane 12 to provide the ground potential to the first through fourth plates PLla through PL4*a*. In example embodiments, the fourth via V4*a* may connect the fourth plate PL4*a* to the ground plane 12. In example embodiments, the fourth via V4*a* penetrating through the sixth conductive layer L6 and the seventh conductive layer L7 may be a through via.

As described above with reference to FIG. 1, the EBG structure including the first pillar PI1*a* and the second pillar PI2*a* may provide various advantages. In addition, the first pitch P1 between the first pillar PI1*a* and the second pillar PI2*a*, a width W of the first through fourth plates PLla through PL4*a* in the Y-axis direction (or a length thereof in the Y-axis direction), and/or the first distance H1 between adjacent plates may be determined according to required impedance of a patch antenna at the time of the antenna design.

Referring to FIG. 4B, a first pillar PI1*b* having the same structure as a second pillar PI2*b* may be adjacent to the second pillar PI2*b* at the first pitch P1. The first pillar PIlb may include a first plate PL1*b*, a second plate PL2*b*, a third plate PL3*b*, and a fourth plate PL4*b*, and may include a first via Vlb, a second via V2*b*, and a third via V3*b* for connecting plates adjacent to each other among the first plate PL1*b*, the second plate PL2*b*, the third plate PL3*b*, and the fourth plate PL4*b*. Unlike the first pillar P11*a* in FIG. 4A, the first pillar PI1*b* of FIG. 4B may further include a first via pad VP1 formed in the sixth conductive layer L6 and a second via pad VP2 formed in the seventh conductive layer L7. Accordingly, the first pillar PI1*b* may include a fourth via V4*b* connecting the fourth plate PL4*b* to the first via pad VP1, and may further include a fifth via V5*b* connecting the first via pad VP1 to a second via pad VP2 and a sixth via V6*b* connecting the second via pad VP2 to the ground plane 12 to provide the ground potential to the second via pad VP2. In example embodiments, the sixth via V6*b* may connect the second via pad VP2 to the ground plane 12. Similar to the plate, the first via pad VP1 and the second via pad VP2 may have any shape on an XY plane or the horizontal plane and may have, for example, a circular shape or a rectangular shape.

Figure 5:
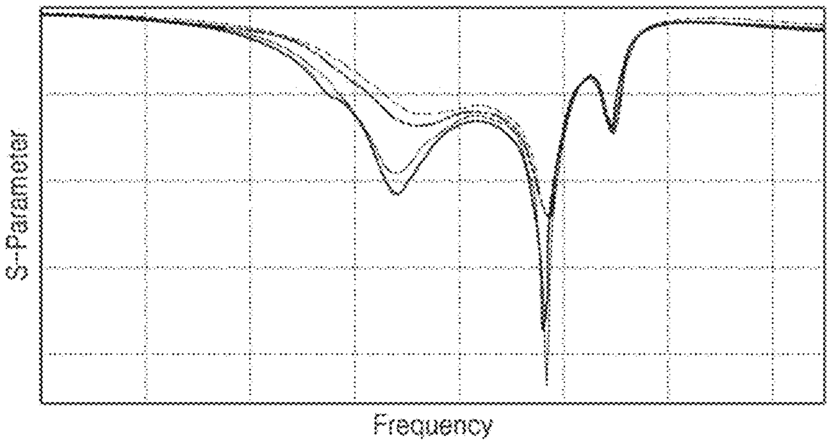
FIG. 5 is a graph illustrating characteristics of an antenna module according to example embodiments.

FIG. 5 is a graph illustrating characteristics of an antenna module according to example embodiments. The graph of FIG. 5 illustrates an S-parameter of an antenna module including the EBG structure and an antenna module omitting the EBG structure in the mmWave frequency band.

The antenna modules omitting the EBG structure may have relatively high S-parameters as indicated by a dashed line and a dash-double dotted line in FIG. 5 at different conditions, while the antenna modules including the EBG structure have relatively low S-parameters as indicated by a thin solid line and a thick solid line in FIG. 5 at the correspondingly different conditions. In this manner, the antenna module including the EBG structure may have a more stable radiation pattern and gain.

Figure 6:
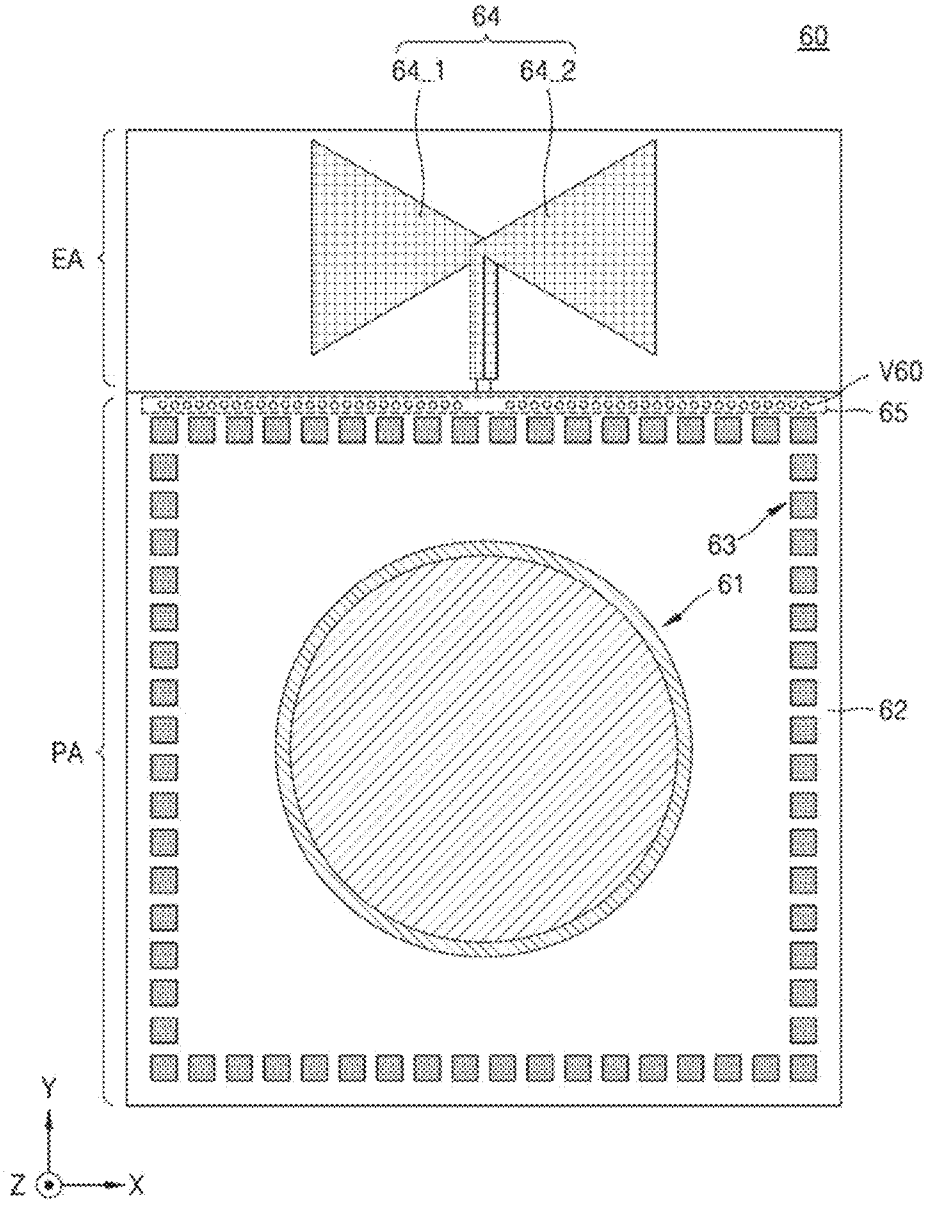
FIG. 6 is a plan view of an antenna module according to an example embodiment.

FIG. 6 is a plan view of an antenna module 60 according to an example embodiment. The plan view of FIG. 6 illustrates the antenna module 60 including a patch antenna 61 and an endfire antenna 64 adjacent to one side of the patch antenna 61. The antenna module 60 of FIG. 6 may include, in a patch antenna portion PA, similar to the antenna module 10 of FIG. 1, the patch antenna 61, a ground plane 62, and an EBG structure 63. In addition, the antenna module 60 may include the endfire antenna 64 in an endfire antenna portion EA adjacent to the patch antenna portion PA in the +Y-axis direction.

Due to strong straightness of high frequency signals such as the mmWave, the antenna module 60 may include the endfire antenna 64 as well as the patch antenna 61 to improve beam coverage. The endfire antenna 64 may include a dipole antenna, and the dipole antenna may generally have a length corresponding to one half of a wavelength (k), for example, a length in the X-axis direction in FIG. 6. However, as described above with reference to FIG. 1, the available space of the antenna module 60 may be limited, and accordingly, it may be required to use a wide bandwidth and relatively good radiation pattern in the limited space.

Referring to FIG. 6, the endfire antenna 64 may include a first pattern 64_1 and a second pattern 64_2. The first pattern 64_1 and the second pattern 64_2 may be configured to receive differential signals from the feed lines in the −Y-axis direction and may be referred to as a first radiator and a second radiator, respectively. As illustrated in FIG. 6, the first pattern 64_1 and the second pattern 64_2 may have shapes symmetrical to each other, and the first pattern 64_1 may be formed in a conductive layer under a conductive layer in which the second pattern 64_2 is formed. Unlike a dipole antenna structure including the patterns arranged in the same conductive layers, the first pattern 64_1 and the second pattern 64_2 of the endfire antenna 64 may be respectively formed in different conductive layers. In addition, as illustrated in FIG. 6, the first pattern 64_1 and the second pattern 64_2 may overlap at least in part in the Z-axis direction. Accordingly, the endfire antenna 64 may use a coupling between the first pattern 64_1 and the second pattern 64_2 and may more easily adjust a coupling coefficient by adjusting an overlapping distance between the first pattern 64_1 and the second pattern 64_2. Thus, the endfire antenna 64 may have a length in the X-axis direction that is shorter than ½ of the wavelength (λ), for example, a length in the X-axis direction that is shorter than about ¼ of the wavelength (λ).

In example embodiments, the endfire antenna 64 may have a bow-tie shape. For example, as illustrated in FIG. 6, each of the first pattern 64_1 and the second pattern 64_2 may have a shape in which a length in the Y-axis direction increases as a distance from an overlapping portion in the Z-axis direction increases. Due to such a bow-tie shape, the bandwidth and impedance matching characteristics of the endfire antenna 64 may be improved. Examples of the endfire antenna 64 are described with reference to FIGS. 8 and 10.

In example embodiments, the antenna module 60 may include a via wall 65 which includes a plurality of vias configured to receive the ground potential for enhancing a reflective effect of the endfire antenna 64. For example, as illustrated in FIG. 6, the antenna module 60 may include the via wall 65 which includes the plurality of vias, for example, V60, etc. aligned in the X-axis direction between the endfire antenna 64 and the EBG structure 63. Due to a ground wall formed by the via wall 65, a relatively good radiation pattern may be generated from the endfire antenna 64. The via wall 65 may include vias apart from each other provided in the X-axis direction as illustrated in FIG. 6, may include vias contacting each other in the X-axis direction, or may include vias forming via pads contacting each other in the X-axis direction.

Figure 7:
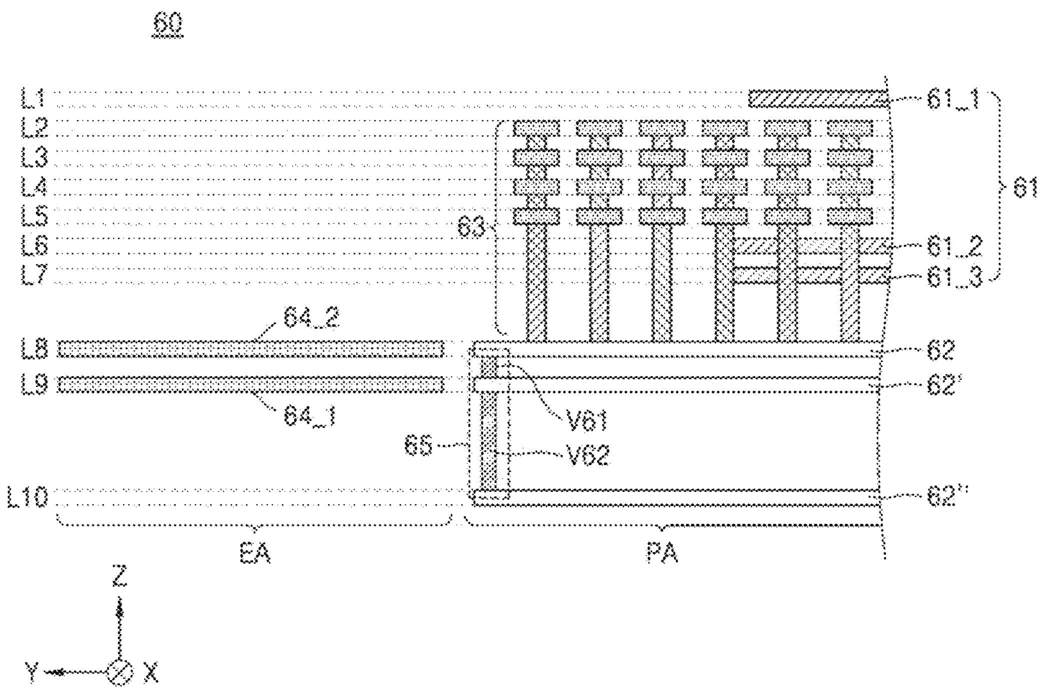
FIG. 7 is a side view of an antenna module according to an example embodiment.

FIG. 7 is a side view of the antenna module 60 according to an example embodiment. The side view of FIG. 7 illustrates the antenna module 60 of FIG. 6 in a direction parallel to the X-axis direction.

Referring to FIG. 7, the antenna module 60 may include, in the patch antenna portion PA, the patch antenna 61, the ground plane 62, and the EBG structure 63. In addition, the antenna module 60 may further include a first additional ground plane 62' and a second additional ground plane 62", which are formed in the ninth conductive layer L9 and the tenth conductive layer L10, respectively. The via wall 65 may be provided between the ground plane 62 and the second additional ground plane 62" and may include the plurality of vias arranged in the X-axis direction. For example, the via wall 65 may include, as illustrated in FIG. 7, vias aligned in the Z-axis direction, that is, first via V61 connecting the ground plane 62 to the first additional ground plane 62' and second via V62 connecting the first additional ground plane 62' to the second additional ground plane 62". In example embodiments, the via wall 65 may include a through via penetrating through the first additional ground plane 62'. In addition, a height of the via wall 65, that is, a length thereof in the Z-axis direction, is not limited to that illustrated in FIG. 7, and in example embodiments, the via wall 65 may extend over the ground plane 62.

The antenna module 60 may include, in the endfire antenna portion EA, the first pattern 64_1 formed in the ninth conductive layer L9 and the second pattern 64_2 formed in the eighth conductive layer L8. As described above with reference to FIG. 6, the first pattern 64_1 and the second pattern 64_2 may be respectively formed in different conductive layers and may at least partially overlap in the Z-axis direction, and thus, a coupling between the first pattern 64_1 and the second pattern 64_2 may be used. In example embodiments, the first pattern 64_1 and the second pattern 64_2 may be formed in conductive layers different from the conductive layer L9 and/or the conductive layer L8, respectively, and may be formed in conductive layers that are not adjacent to each other based on a coupling coefficient.

Figure 8:
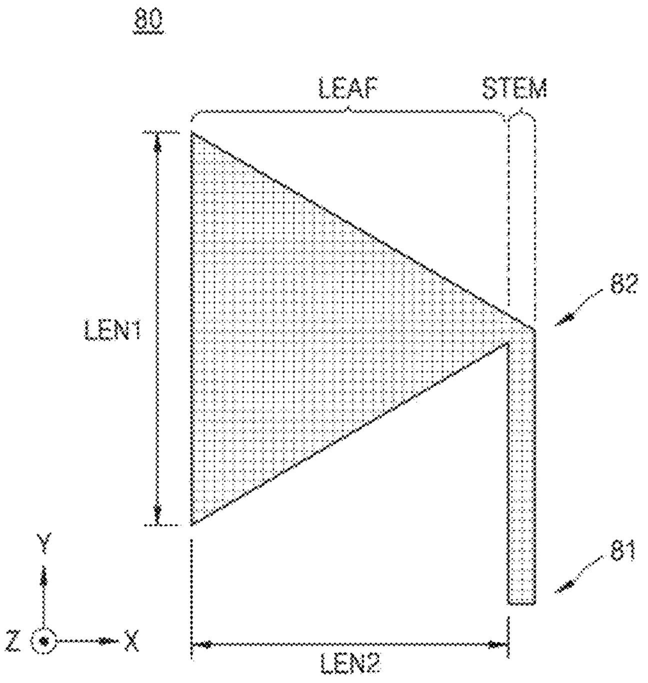
FIG. 8 is a plan view of a pattern of an endfire antenna, according to an example embodiment of the inventive concept.
Figure 9A:
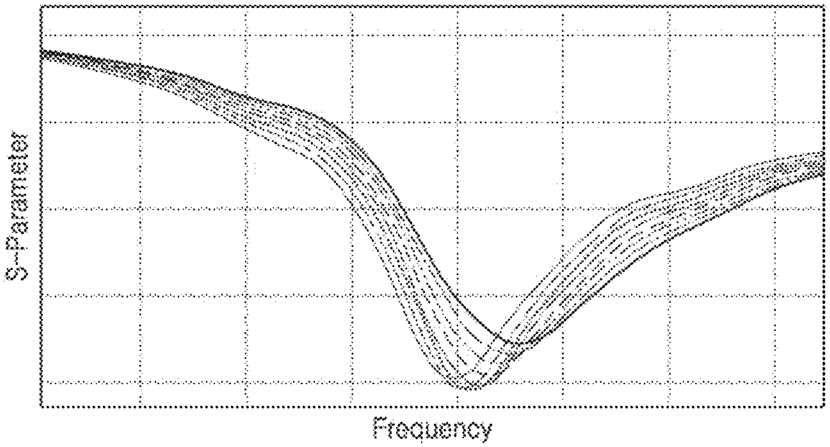
FIGS. 9A and 9B are graphs of characteristics of an antenna module, according to example embodiments of the inventive concept.
Figure 9B:
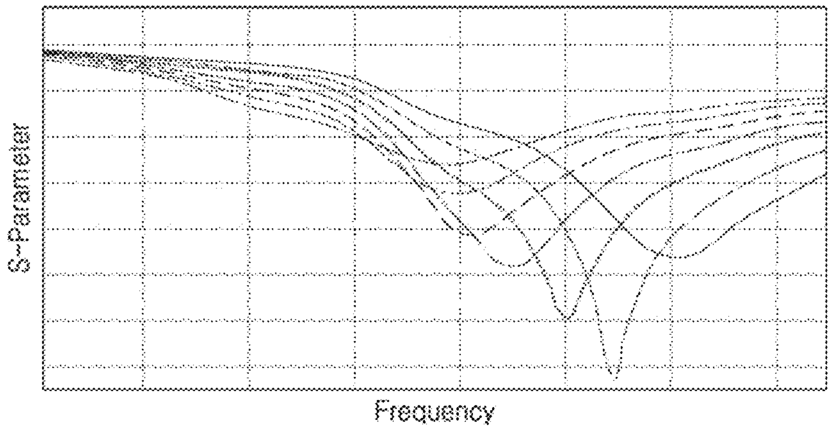

FIG. 8 is a plan view of a pattern of the endfire antenna 64 according to an example embodiment, and FIGS. 9A and 9B are graphs illustrating characteristics of an antenna module according to example embodiments. The plan view of FIG. 8 illustrates a pattern 80 as an example of the first pattern 64_1 included in the endfire antenna 64 in FIG. 6, and the second pattern 64_2 illustrated in FIG. 6 may have a shape symmetrical with that of the pattern 80 illustrated in FIG. 8 with respect to the Y-axis. In addition, graphs in FIGS. 9A and 9B illustrate S-parameters of the endfire antenna 64 including the pattern 80 of FIG. 8 and a pattern having a symmetrical shape with the pattern 80 in the mmWave frequency band. Hereinafter, FIGS. 8, 9A, and 9B are described with reference to FIG. 6.

Referring to FIG. 8, the endfire antenna 64 may have a bow-tie shape as described above with reference to FIG. 6. As illustrated in FIG. 8, the pattern 80 may include a leaf portion LEAF and a stem portion STEM. The stem portion STEM may extend in the Y-axis direction and may include a first end 81 for receiving a differential signal and a second end 82 connected to the leaf portion LEAF. The leaf portion LEAF may be connected to the second end 82 of the stem portion STEM and may have a shape expanding in the Y-axis direction away from the second end 82 of the stem portion STEM. The leaf portion LEAF may have a first length LEN1 in the Y-axis direction and a second length LEN2 in the X-axis direction. The first length LEN1 and the second length LEN2 may, as described below, be determined based on a required main frequency of the endfire antenna 64. In the present disclosure, the first length LEN1 may be a width of the leaf portion LEAF, and the second length LEN2 may be a length of the leaf portion LEAF.

Referring to FIG. 9A, when the overlapping distance between two patterns is constant, the main frequency of the endfire antenna 64 may vary according to the first length LEN1. Similarly, referring to FIG. 9B, when the overlapping distance between two patterns is constant, the main frequency of the endfire antenna 64 may vary according to the second length LEN2. Thus, the first length LEN1 and the second length LEN2 of the pattern 80 may be determined based on the required main frequency.

Figure 10:
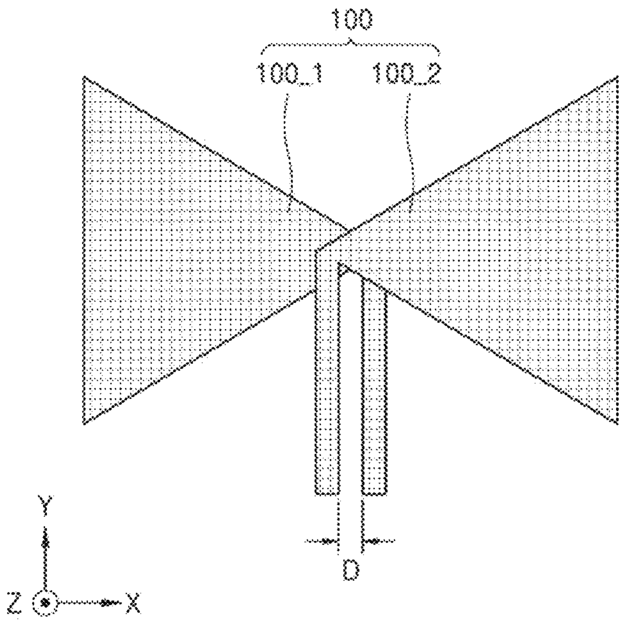
FIG. 10 is a plan view of an endfire antenna according to an example embodiment.
Figure 11:
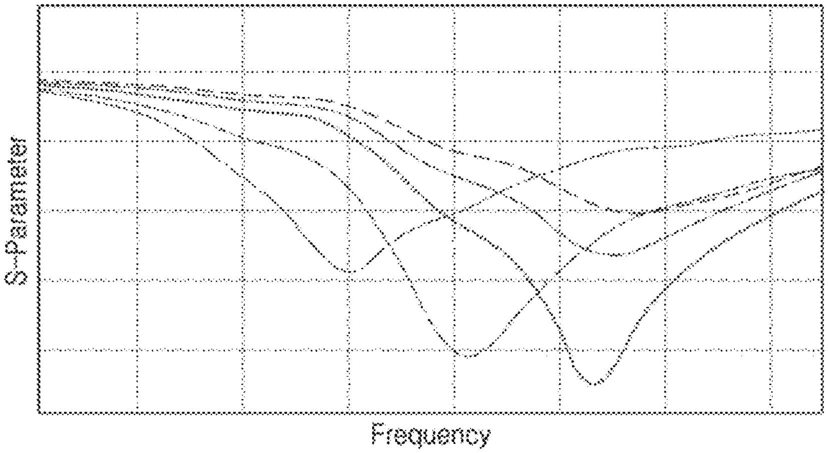
FIG. 11 illustrates a graph of characteristics of an antenna module according to an example embodiment.

FIG. 10 is a plan view of an endfire antenna 100 according to an example embodiment, and FIG. 11 illustrates a graph of characteristics of an antenna module according to an example embodiment. The plan view of FIG. 10 illustrates the endfire antenna 100 including a first pattern 100_1 having the same shape as the pattern 80 of FIG. 8 and a second pattern 100_2 having a symmetrical shape with the pattern 80 of FIG. 8. In addition, the graph in FIG. 11 illustrates the S-parameters of the endfire antenna 100 of FIG. 10 according to an overlapping distance D in the mmWave frequency band.

Referring to FIG. 10, as described above with reference to FIGS. 9A and 9B, the main frequency may vary according to dimensions of the first pattern 100_1 and the second pattern 100_2. As described above with reference to FIG. 6, the bandwidth, a gain, and/or a main frequency of the endfire antenna 100 may vary according to the degree of overlapping between the first pattern 100_1 and the second pattern 100_2. For example, as illustrated in FIG. 10, the overlapping distance D indicating a distance in which the leaf portion LEAF of the first pattern 100_1 and the leaf portion LEAF of the second pattern 100_2 overlap in the X-axis direction may be defined, and the bandwidth, the gain, and/or the main frequency of the endfire antenna 100 may depend on the overlapping distance D.

Referring to FIG. 11, when the shapes of the first pattern 100_1 and the second pattern 100_2 are maintained, the bandwidth, the gain, and the main frequency of the endfire antenna 100 may vary according to the overlapping distance D. Accordingly, the overlap distance D of the endfire antenna 100 may be determined based on the required bandwidth, gain, and/or main frequency.

Figure 12:
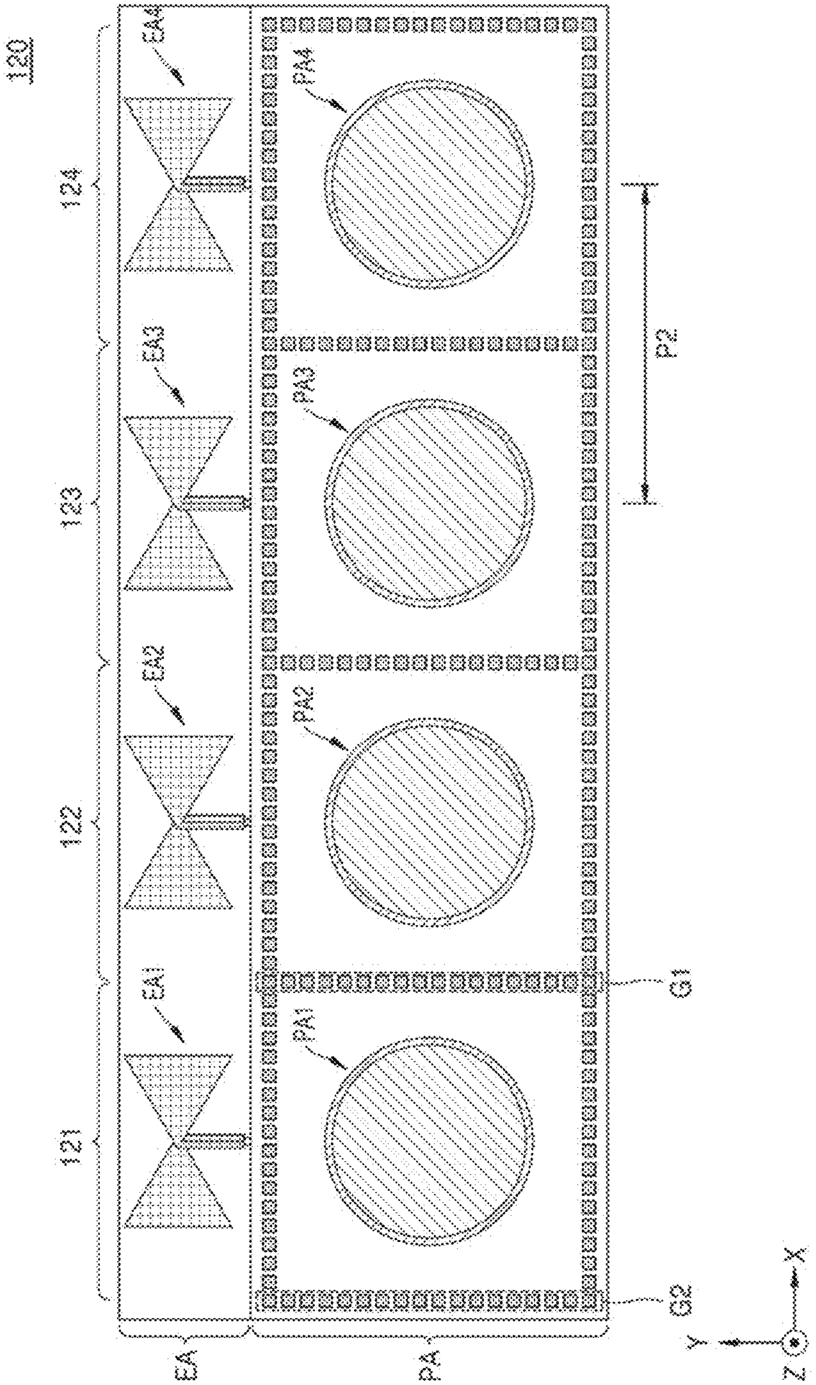
FIG. 12 is a plan view of an antenna module according to an example embodiment of the inventive concept.
Figure 13A:
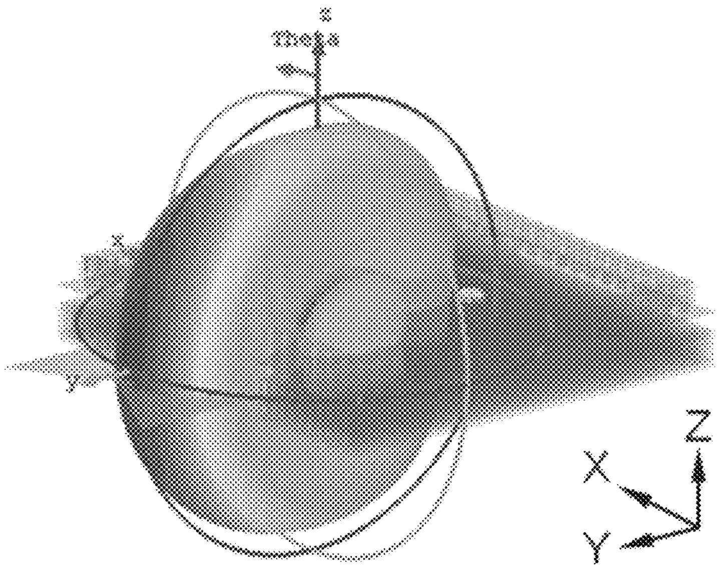
FIGS. 13A, 13B, and 13C are graphs illustrating characteristics of an antenna module according to example embodiments.
Figure 13B:
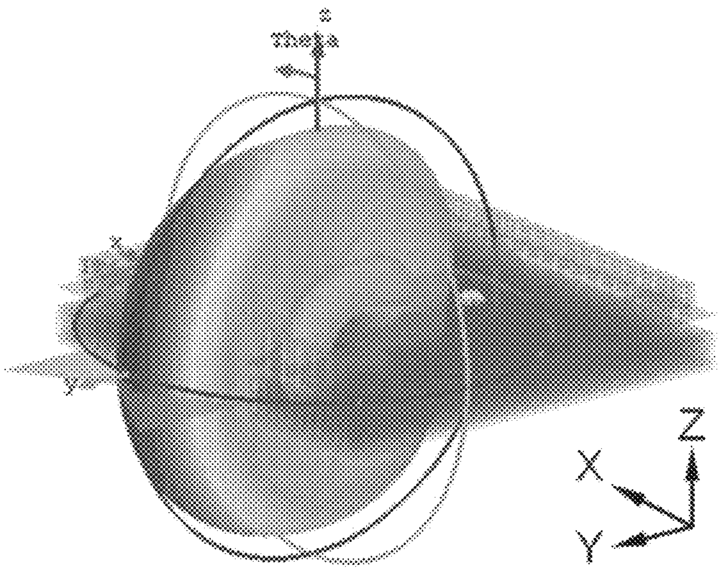
Figure 13C:
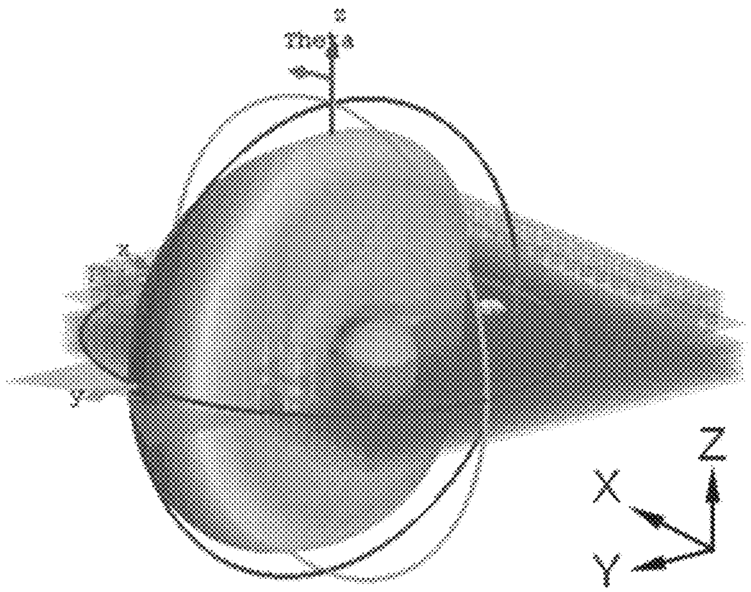

FIG. 12 is a plan view of an antenna module 120 according to an example embodiment, and FIGS. 13A, 13B, and 13C are graphs illustrating characteristics of the antenna module 120 according to example embodiments. The plan view of FIG. 12 illustrates the antenna module 120 including a 1×4 antenna array. In addition, the graphs of FIGS. 13A, 13B, and 13C illustrate radiation patterns of the antenna module 120 of FIG. 12 according to pitches of single elements.

Referring to FIG. 12, the antenna module 120 may include a first single element 121, a second single element 122, a third single element 123, and a fourth single element 124, which are spaced apart from each other according to a second pitch P2. In example embodiments, each of the first single element 121, the second single element 122, the third single element 123, and the fourth single element 124 may have the same or similar structure as the antenna module 60 of FIG. 6. The antenna module 120 may include a via wall, similar to the via wall 65 in FIG. 6, to which the ground potential is applied, between the endfire antennas EA1 through EA4 and the EBG structure 125.

Each of the first single element 121, the second single element 122, the third single element 123, and the fourth single element 124 of the antenna module 120 may include, in the patch antenna portion PA, first patch antenna PA1, second patch antenna PA2, third patch antenna PA3, and fourth patch antenna PA4, respectively, and the EBG structure 125. The first through fourth patch antennas PA1 through PA4 may be spaced apart from each other in the X-axis direction according to the second pitch P2. The EBG structure 125 may include a plurality of pillars, and the plurality of pillars may surround the first through fourth patch antennas PA1 through PA4 while separating the first through fourth patch antennas PA1 through PA4 from each other in a direction perpendicular to the Z-axis direction. In example embodiments, the patch antennas adjacent to each other may share a plurality of pillars arranged between the patch antennas adjacent to each other. For example, as illustrated in FIG. 12, a plurality of pillars G1 aligned in the Y-axis direction between the first patch antenna PA1 and the second patch antenna PA2 may be arranged like a plurality of pillars G2 which are apart from the first patch antenna PA1 in the −X-axis direction and aligned in the Y-axis direction. Accordingly, a phenomenon in which the ground potential between the patch antennas becomes greater than the ground potential at the edge of the antenna array may be reduced or prevented, and as a result, the first patch antenna PA1 and the fourth patch antenna PA4 respectively included in the single elements arranged adjacent to the edge of the antenna module 120, that is, the first single element 121 and the fourth single element 124 may have the same environment as the second patch antenna PA2 and the third patch antenna PA3 respectively included in the second single element 122 and the third single element 123.

The antenna module 120 may include first endfire antenna EA1, the second endfire antenna EA2, the third endfire antenna EA3, and the fourth endfire antenna EA4 in the endfire antenna portion EA adjacent to the patch antenna portion PA in the +Y-axis direction. The first through fourth endfire antennas EA1 through EA4 may be apart from each other in the X-axis direction according to the second pitch P2.

Referring to FIGS. 13A, 13B, and 13C, a gain and a half power beam width (HPBW) of the antenna module 120 may vary according to the second pitch P2 of the single elements. FIG. 13A illustrates a radiation pattern corresponding to the smallest second pitch P2, FIG. 13B illustrates a radiation pattern corresponding to a medium second pitch P2, and FIG. 13C illustrates a radiation pattern corresponding to the largest second pitch P2. As the second pitch P2 increases, an angle of the HPBW on a Z-Y plane covered by the first through fourth endfire antennas EA1 through EA4 may be maintained, while the angle of the HPBW on the X-Y plane, that is, on a plane where beamforming is formed is reduced, and a sidelobe increases. Accordingly, the second pitch P2 may be determined to compensate for an insufficient resolution of phase shifters corresponding to the first through fourth single elements 121 through 124. In addition, the antenna module 120 may have properties similar to those when the corresponding components are omitted, even in the case where components capable of being arranged under the first through fourth patch antennas PA1 through PA4 and the first through fourth endfire antennas EA1 through EA4, for example, the feed line, a radio frequency integrated circuit (RFIC), and the like are included.

Figure 14:
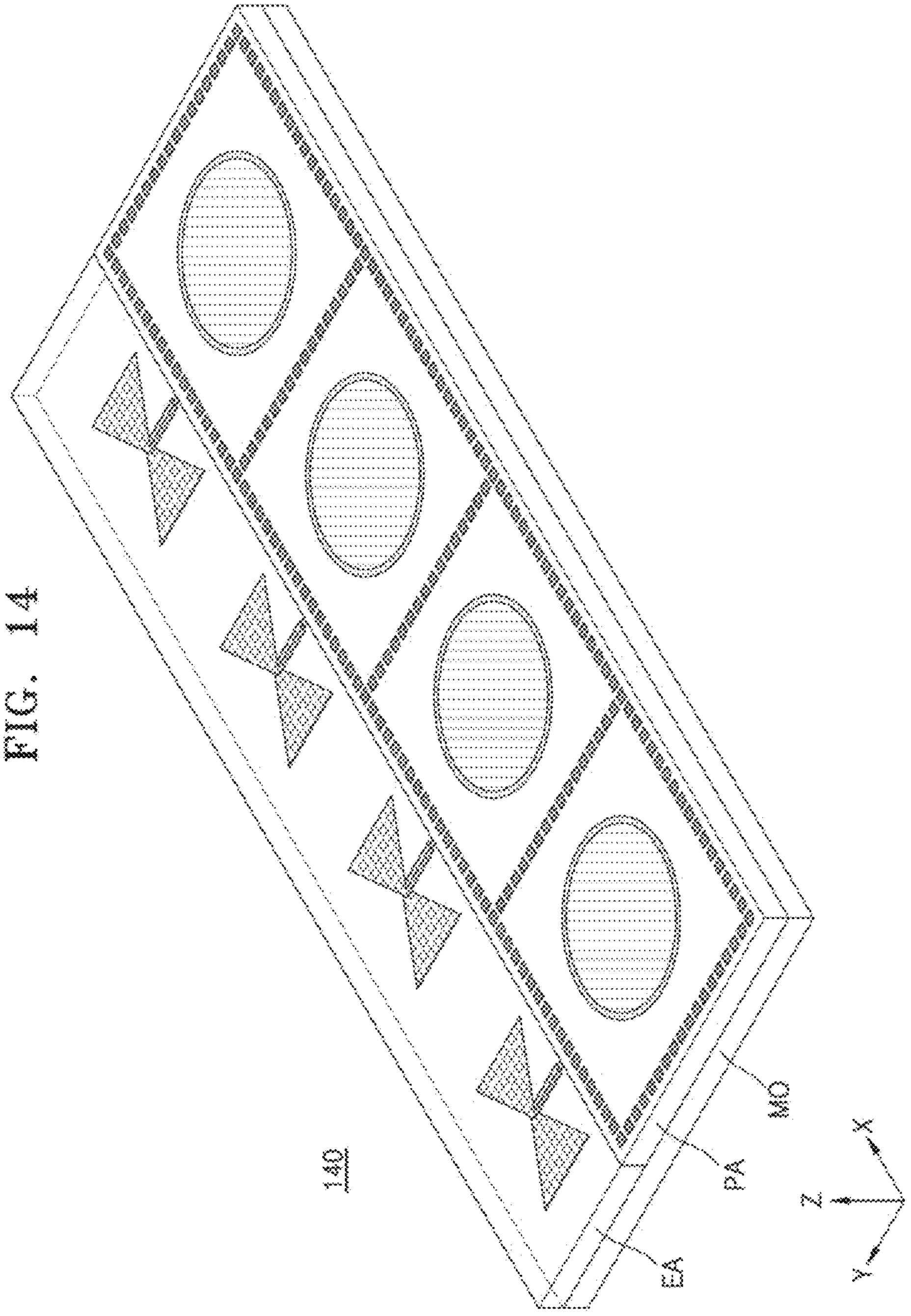
FIG. 14 is a perspective view of an antenna module according to an example embodiment.

FIG. 14 is a perspective view of an antenna module 140 according to an example embodiment. The perspective view of FIG. 14 illustrates an antenna module 140 that includes an antenna array corresponding to the plan view of FIG. 12 and a molding portion MO arranged under the antenna array.

As illustrated in FIG. 14, the antenna module 140 may include the patch antenna portion PA and the endfire antenna portion EA which are adjacent to each other in the Y-axis direction, and the molding portion MO under the patch antenna portion PA and the endfire antenna portion EA in the Z-axis direction. The antenna module 140 may include the RFIC, a passive element, and the like on bottom surfaces of the patch antenna portion PA and the endfire antenna portion EA. The molding portion MO may include an epoxy molding compound (EMC) material to improve mounting reliability and heat dissipation characteristics of the RFIC and the passive element. The molding portion MO may affect characteristics of the endfire antennas included in the endfire antenna portion EA. For example, when, in the endfire antenna portion EA, permittivity of the dielectric surrounding the endfire antennas is higher than that of the EMC material, the active S-parameters of the endfire antennas and boresight directions of the radiation patterns may vary. Hereinafter, examples of the antenna module 140 which are designed in consideration of the EMC material of the molding portion MO are described below with reference to FIGS. 15A and 15B.

Figure 15A:
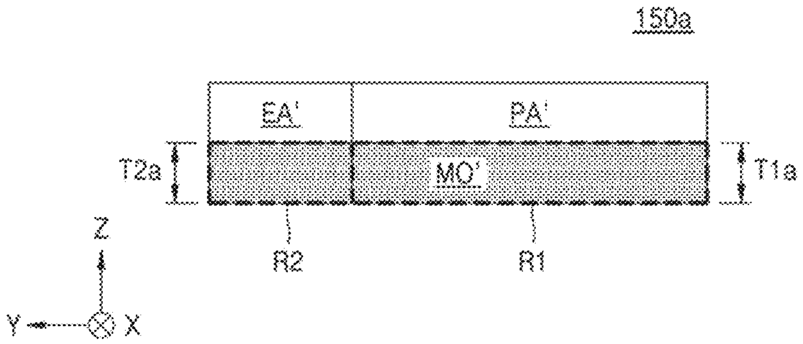
FIGS. 15A and 15B are side views of examples of an antenna module according to example embodiments.
Figure 15B:
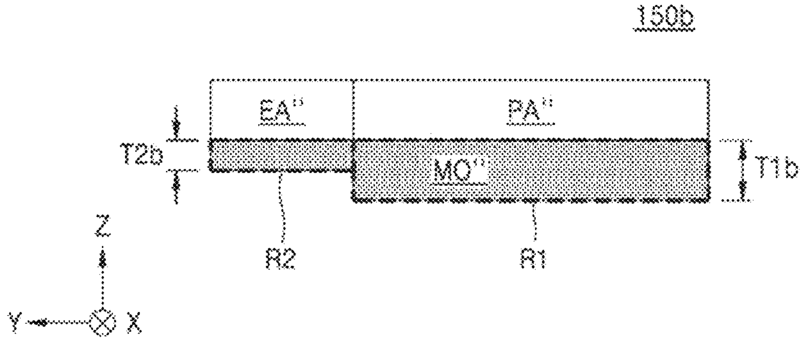

FIGS. 15A and 15B are side views of examples of the antenna module 140, according to example embodiments. The side views of FIGS. 15A and 15B illustrate examples of the antenna module 140 of FIG. 14 in a direction parallel to the X-axis direction.

Referring to FIG. 15A, an antenna module 150*a* may include a patch antenna portion PA' and an endfire antenna portion EA', which are adjacent to each other in the Y-axis direction, and may include a molding portion MO' under the patch antenna portion PA' and the endfire antenna portion EA'. The molding portion MO' may include a first region R1 under the patch antenna portion PA' and a second region R2 under the endfire antenna portion EA'. In example embodiments, the EMC material constituting the molding portion MO' may have a dielectric constant that matches a dielectric constant of the dielectric surrounding the endfire antennas in the endfire antenna portion EA'. Accordingly, a second thickness T2*a*, that is, a length in the Z-axis direction of the second region R2 may match a first thickness T1*a* of the first region R1.

Referring to FIG. 15B, an antenna module 150*b* may include a patch antenna portion PA" and an endfire antenna portion EA", which are adjacent to each other in the Y-axis direction, and may include a molding portion MO" under the patch antenna portion PA" and the endfire antenna portion EA". The molding portion MO" may include the first region R1 under the patch antenna portion PA" and the second region R2 under the endfire antenna portion EA". In example embodiments, the EMC material constituting the molding portion MO" may have a dielectric constant that matches the dielectric constant of the dielectric surrounding the endfire antennas in the endfire antenna portion EA". Accordingly, a second thickness T2*b*, that is, a length in the Z-axis direction of the second region R2 may be less than a first thickness T1*b* of the first region R1. In this manner, when the molding portion MO" has a reduced thickness under the endfire antenna portion EA", an EMC material with a high dielectric constant may be used, and due to advantages provided by the EMC material, the performance of the antenna module 150*b* may be further improved.

Figure 16:
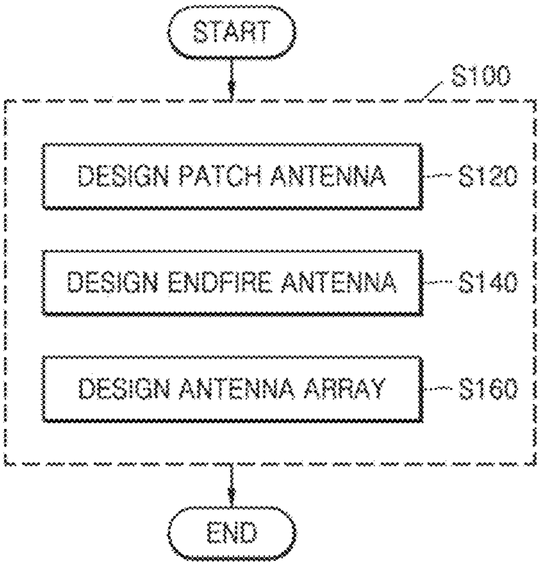
FIG. 16 is a flowchart of a design method of an antenna according to an example embodiment.

FIG. 16 is a flowchart of a design method of an antenna according to an example embodiment. The design method S100 of the antenna of FIG. 16 may be a design method of an antenna module, and may indicate a design method of an antenna module including an antenna array such as the antenna module 140 of FIG. 14. As illustrated in FIG. 16, the design method S100 of the antenna may include a plurality of operations S120, S140, and S160, and each of the plurality of operations S120, S140, and S160 may be performed again based on results of performing other operations. In example embodiments, the design method S100 of the antenna of FIG. 16 may be performed by a computing system which includes a non-volatile storage medium that stores at least one processor and software including a series of instructions executed by the at least one processor, and the computing system may generate data that includes geometric information about the designed antenna module.

According to the design method of an antenna of the example embodiment, an operation of designing a patch antenna may be performed (S120). For example, the number, dimensions, arrangement, and the like of radiators included in the patch antenna may be determined, and a structure of the plurality of pillars included in the EBG structure surrounding the patch antenna may be determined. An example of operation S120 is described below with reference to FIG. 17. An operation of designing an endfire antenna may be performed (S140). For example, dimensions of patterns of shapes symmetrical to each other included in the endfire antenna, a separating distance in the Z-axis direction, an overlapping distance in the X-axis direction, and the like may be determined. An example of operation S140 is described below with reference to FIG. 18. An operation of designing an antenna array may be performed (S160). For example, a pitch of the single elements, dimensions of the molding portion, and the like may be determined. An example of operation S160 is described below with reference to FIG. 19.

Figure 17:
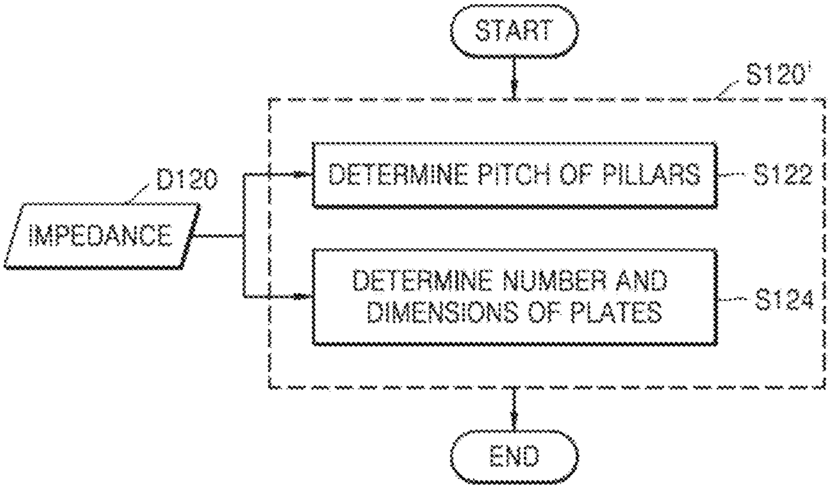
FIG. 17 is a flowchart of a design method of an antenna according to an example embodiment.

FIG. 17 is a flowchart of a design method of an antenna according to an example embodiment. The flowchart of FIG. 17 illustrates an example of operation S120 in FIG. 16, and as described above with reference to FIG. 16, an operation of designing a patch antenna may be performed (S120'). Operation S120' may include operation S122 and operation S124, and in example embodiments, each of operation S122 and operation S124 may be performed again based on a result of performing another operation.

An operation of determining the pitch of the pillars based on a target impedance D120 of the patch antenna may be performed (S122). As described above with reference to the drawings, the EBG structure may improve an impedance matching of the patch antenna. The EBG structure may include a plurality of pillars, and the pitch of the pillars may be determined based on the target impedance D120 of the patch antenna.

An operation of determining the number and pitch of the plates based on the target impedance D120 of the patch antenna may be performed (S124). The pillars included in the EBG structure may include two or more plates that are parallel to each other, and the plates may be respectively formed in the conductive layers in which the radiators of the patch antenna are not formed. According to the number and dimensions of the plates, the impedance of the patch antenna may vary, and accordingly, the number and dimensions of the plates may be determined based on the target impedance D120 of the patch antenna.

Figure 18:
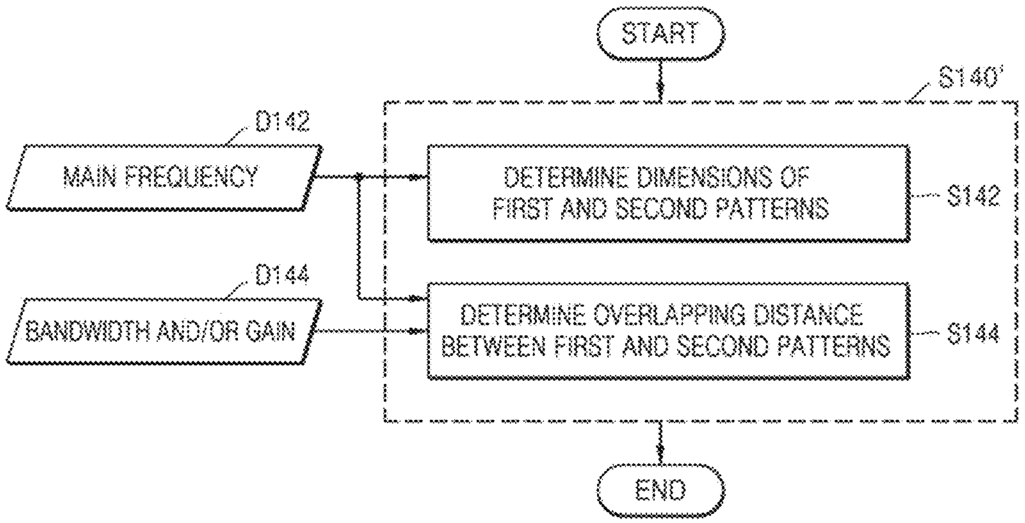
FIG. 18 is a flowchart of a design method of an antenna according to an example embodiment.

FIG. 18 is a flowchart of a design method of an antenna according to an example embodiment. The flowchart of FIG. 18 illustrates an example of operation S140 in FIG. 16, and as described above with reference to FIG. 16, an operation of designing the endfire antenna may be performed (S140'). Operation S140' may include operation S142 and operation S144, and in example embodiments, each of operation S142 and operation S144 may be performed again based on a result of performing another operation. Hereinafter, FIG. 18 is described with reference to FIG. 10.

An operation of determining dimensions of the first pattern 100_1 and the second pattern 100_2 may be performed based on a target main frequency D142 of the endfire antenna 100 (S142). As described above with reference to FIGS. 9A and 9B, the main frequency may vary according to dimensions of the leaf portions LEAF of the first pattern 100_1 and the second pattern 100_2. Accordingly, lengths and widths of the leaf portions LEAF of the first pattern 100_1 and the second pattern 100_2 may be determined based on the target main frequency D142 of the endfire antenna 100.

An operation of determining the overlapping distance D of the first pattern 100_1 and the second pattern 100_2 may be performed based on the target main frequency D142 and a target bandwidth and/or gain D144 of the endfire antenna 100 (S144). As described above with reference to FIGS. 10 and 11, the main frequency D142, the bandwidth and gain D144 of the endfire antenna 100 may vary according to the overlapping distance D of the first pattern 100_1 and the second pattern 100_2. Accordingly, the overlapping distance D may be determined based on the target main frequency D142, the target bandwidth, and/or the gain D144 of the endfire antenna 100.

Figure 19:
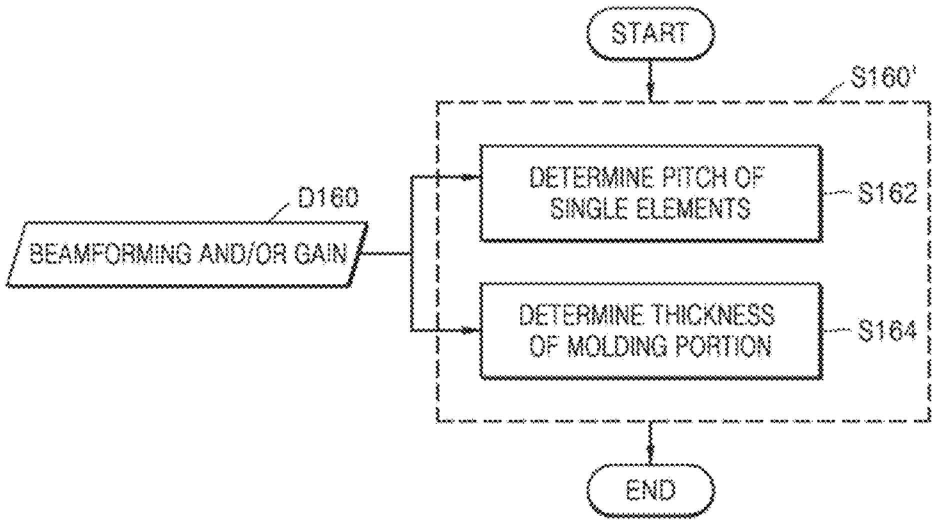
FIG. 19 is a flowchart of a design method of an antenna according to an example embodiment.

FIG. 19 is a flowchart of a design method of an antenna according to an example embodiment. The flowchart of FIG. 19 illustrates an example of operation S160 in FIG. 16, and as described above with reference to FIG. 16, an operation of designing an antenna array may be performed (S160'). Operation S160' may include operation S162 and operation S164, and in example embodiments, each of operation S162 and operation S164 may be performed again based on a result of performing another operation. Hereinafter, FIG. 19 is described with reference to FIG. 14.

An operation of determining a pitch of the single elements based on a target beam forming or a beam forming specification and/or gain D160 may be performed (S162). As described above with reference to FIGS. 12, 13A, 13B, and 13C, the gain and the HPBW of the antenna module 140 of FIG. 14 may vary according to the pitch of the single elements, that is, the second pitch P2. Accordingly, the pitch of the single elements may be determined based on the target beamforming and/or gain D160 of the antenna module 140.

An operation of determining a thickness of the molding portion MO based on the target beamforming and/or gain D160 may be performed (S164). As described above with reference to FIGS. 14, 15A, and 15B, when the EMC material has a dielectric constant different from that of the dielectric surrounding the endfire antenna, the active S-parameter and the radiation pattern of the endfire antenna may vary according to the thickness of the molding portion MO including the EMC material under the endfire antenna portion EA. Accordingly, the thickness of the molding portion MO under the endfire antenna portion EA may be determined based on the target beamforming and/or gain D160 of the antenna module 140.

While example embodiments have been described with reference to the figures, it will be understood by those of ordinary skill in the art that various changes in form and details may be made therein without departing from the spirit and scope as defined by the following claims.

What is claimed is:

1. An antenna module comprising a plurality of conductive layers stacked in a first direction, the antenna module comprising:

a molding portion comprising a first region and a second region that are adjacent to each other in a second direction perpendicular to the first direction, the molding portion comprising an epoxy molding compound (EMC);

a first patch antenna comprising at least one radiator provided in at least one conductive layer over the first region; and an endfire antenna comprising a first pattern and a second pattern having shapes symmetrical to each other, the endfire antenna being provided over the second region, and the first pattern and the second pattern being configured to receive differential signals.

2. The antenna module of claim 1, wherein the EMC has a same permittivity as a dielectric material surrounding the first pattern and the second pattern.

3. The antenna module of claim 1, wherein a length of the second region is less than a length of the first region in the first direction.

4. The antenna module of claim 1, wherein the first pattern and the second pattern are respectively provided in different layers, and respectively comprise overlapping portions in the first direction.

5. The antenna module of claim 1, wherein the first pattern and the second pattern are configured to receive the differential signals from feed lines adjacent to each other in a third direction perpendicular to the first direction and the second direction, wherein each of the first pattern and the second pattern comprises:

a stem portion comprising a first end configured to receive a differential signal, the stem portion extending in the second direction; and a leaf portion connected to a second end of the stem portion, the leaf portion comprising a shape expanding in the second direction away from the second end of the stem portion.

6. The antenna module of claim 5, wherein the stem portion of the first pattern overlaps the second pattern at least in part in the first direction, and wherein the leaf portion of the second pattern overlaps the first pattern at least in part in the first direction.

7. The antenna module of claim 5, wherein the leaf portion of the first pattern overlaps the second pattern at least in part in the first direction, and wherein the leaf portion of the second pattern overlaps the first pattern at least in part in the first direction.

8. The antenna module of claim 5, further comprising a via wall comprising a plurality of vias that are spaced apart from the first pattern and the second pattern in the second direction, respectively, and being provided in a the third direction, respectively, the plurality of vias being configured to receive a ground potential.

9. The antenna module of claim 1, further comprising an electromagnetic band gap (EBG) structure comprising a plurality of pillars that are spaced apart from the at least one radiator in a direction perpendicular to the first direction, the plurality of pillars surrounding the at least one radiator.

10. The antenna module of claim 9, wherein each of the plurality of pillars comprises two or more plates provided parallel with each other in two or more conductive layers, respectively, and at least one via connecting the two or more plates.

11. The antenna module of claim 9, wherein the first pattern and the second pattern are respectively provided in conductive layers different from the at least one conductive layer in which the at least one radiator is provided.

12. An antenna module comprising a plurality of conductive layers stacked in a first direction, the antenna module comprising:

a molding portion comprising a first region and a second region that are adjacent to each other in a second direction perpendicular to the first direction, the molding portion comprising an epoxy molding compound (EMC);

a plurality of patch antennas arranged in a third direction perpendicular to the first direction and the second direction over the first region; and a plurality of endfire antennas arranged in the third direction over the second region, wherein each of the plurality of endfire antennas comprises a first pattern and a second pattern having symmetrical shapes to each other, the first pattern and the second pattern being configured to receive differential signals from feed lines adjacent to each other in the third direction, wherein the first pattern and the second pattern are respectively provided in different layers, and respectively comprise overlapping portions in the first direction.

13. The antenna module of claim 12, wherein each of the first pattern and the second pattern comprises:

a stem portion comprising a first end configured to receive a differential signal, the stem portion extending in the second direction; and a leaf portion connected to a second end of the stem portion, the leaf portion comprising a shape expanding in the second direction away from the second end of the stem portion.

14. The antenna module of claim 12, further comprising an electromagnetic band gap (EBG) structure comprising a plurality of pillars that are spaced apart from the plurality of patch antennas in a direction perpendicular to the first direction, the plurality of pillars surrounding at least one radiator.

15. An antenna module comprising a plurality of conductive layers stacked in a first direction, the antenna module comprising:

a molding portion comprising a first region and a second region that are adjacent to each other in a second direction perpendicular to the first direction, the molding portion comprising an epoxy molding compound (EMC);

a plurality of patch antennas arranged in a third direction perpendicular to the first direction and the second direction over the first region; and a plurality of endfire antennas arranged in the third direction over the second region; and an electromagnetic band gap (EBG) structure comprising a plurality of pillars that are spaced apart from the plurality of patch antennas in a direction perpendicular to the first direction, the plurality of pillars surrounding at least one radiator, wherein each of the plurality of pillars comprises two or more plates provided parallel with each other in two or more conductive layers, respectively, and at least one via connecting the two or more plates.

* * * * *